L. SANFORD.
Tree-Protector.
No. 49,440.    Patented Aug. 15, 1865.
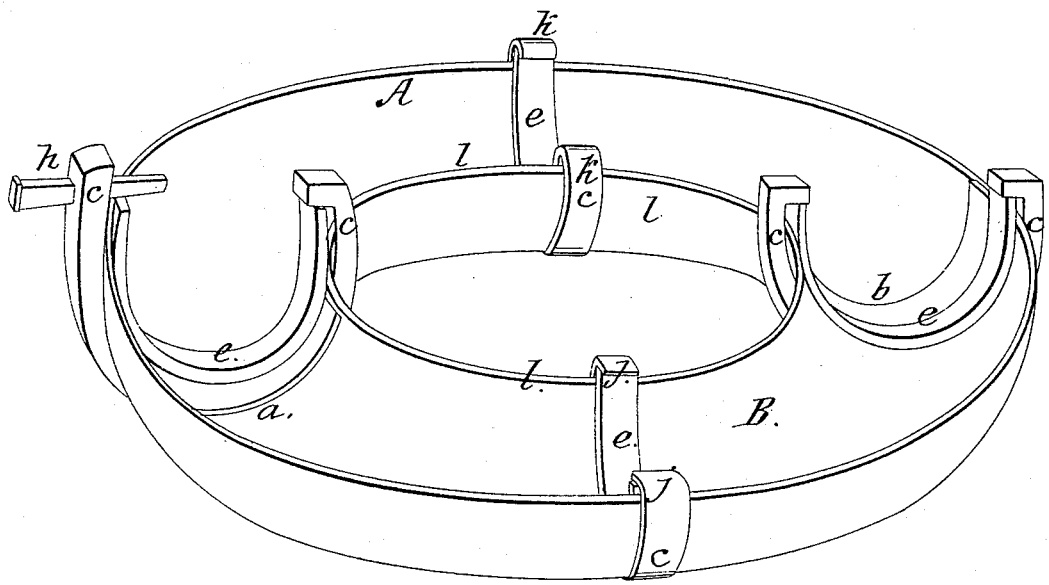
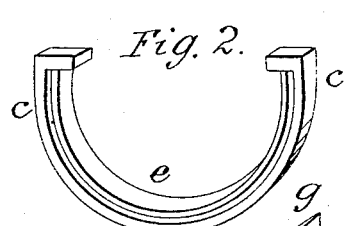
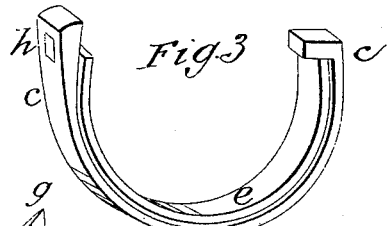
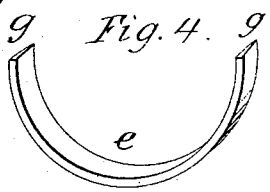
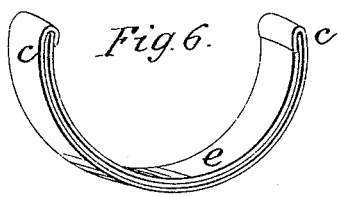
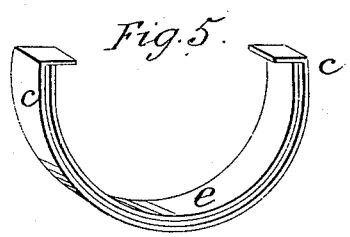
Witnesses
Geo. E. Townsend
R. Fitzgerald
Inventor
Lockwood Sanford

UNITED STATES PATENT OFFICE.

LOCKWOOD SANFORD, OF NEW HAVEN, CONNECTICUT.

IMPROVEMENT IN TREE-PROTECTORS.

Specification forming part of Letters Patent No. 49,440, dated August 15, 1865.

*To all whom it may concern:*

Be it known that I, LOCKWOOD SANFORD, of the city and county of New Haven, in the State of Connecticut, have invented a new and useful Improvement in Making and Attaching Tree-Protectors; and I do hereby declare that the following is a full, clear, and exact description of the construction, character, and operation of the same, reference being had to the accompanying drawings, which make part of this specification, in which—

Figure 1 is a perspective view of the protector as it will be when on the tree or in use, showing several ways of securing the joints by two parts, one inside and the other outside of the trough. Fig. 2 is a perspective view of the two parts of the fastener as they will appear when put together without the trough. Fig. 3 is a perspective view of the two parts when a wedge or key is to be used on one of the sides for tightening the fastener. Fig. 4 is a perspective view of the inner part of the fastener, showing its wedge-shape form in the cross-section. Fig. 5 is a perspective view of the fastener when made of heavy sheet-iron or thin band-iron. Fig. 6 is a perspective view of the same when made of zinc or other non-elastic sheet metal. Fig. 7 is a cross-section of Fig. 2 cut centrally.

My improvement consists in making the trough or protector of two or more pieces lapping one into the other, and securing the joints or laps by clasps or fasteners made of two parts, which may be readily put on or taken off, as desired, and so that the trough may be readily fitted to the size of the tree without cutting, and the joints yield or be relaxed to suit the growth of the tree.

I make the trough A B, Fig. 1, of sheet-lead or any other suitable material, of such width that no "measure-worm" can reach across it, and of sufficient depth to hold the requisite quantity of water or other liquid to drown the worms or grubs; and I make it of two or more pieces, so as to bring them upon the opposite sides of the tree, and bring the ends together and lap or slide one into the other, as indicated at *a* and *b*, Fig. 1, so as to bring it to the size of the tree at all times.

I make the outer part of the clasp or fastener of cast-iron, or any other suitable material, substantially of the shape or form shown at *c c*, Figs. 1 and 2, with the upper ends at right angles to the curve, and the curved part forming about a semicircle, as shown in Fig. 2, and wedge-shaped in its cross-section, as indicated at *d*, Fig. 7.

I make the inner part of the fastener of cast-iron, or any other suitable material, substantially of the shape or form shown in Fig. 4 and indicated at *e* in Figs. 1, 2, and 3, and I make it cuniform in the cross-section, as shown at *g*, Figs. 4 and 7, so that the two parts will continue to bind tighter as they approach their final position, as indicated in cross-section in Fig. 7, to render the attaching and detaching more easy.

If thought best at any time, one of the ends of the outer part may be made with a mortise or key-hole in it, as shown at *h*, Fig. 3, or at right angles to that, and the pair be tightened by a key, as represented at *h*, Fig. 1; or the two parts may be made of heavy sheet-iron or light band-iron, and put together as represented in Fig. 5 and at *j j*, Fig. 1; or of sheet-zinc or any other non-elastic substance, and connected as represented in Fig. 6 and at *k k*, Fig. 1, but I prefer the first-described form and character, as shown in Fig. 2 and in its place for use at *c e c*, Fig. 1; and the trough may be made of tea-lead, or even of painted, varnished, or tarred pasteboard, and placed on the ground in a circle around the smaller shrubs, as rose-bushes, &c., in gardens, yards, &c.; and may be made of more than two pieces, if more convenient.

When the parts are constructed as before described I take the two parts A and B of the trough and place them on each side of the tree, and bring their ends together so that they will lap at each junction, as represented at *a* and *b*, and pass the outer portion of the clasp or fastener, as *c c*, Fig. 2, around the trough, at one of the joints, as at *b*, Fig. 1, and then crowd or drive the inner part, *e*, Fig. 4, into its place within the trough, as at *e*, Fig. 1, in such a position that the wedge shape of the cross-section of the parts will be in relation to each other as they are shown at *d g*, Fig. 7, when the joint or lap will be secured, and I fasten the other joint or lap in the same way, when lapped, so as to exactly fit the tree. If occasion should require it, three or more pieces of trough may be used, with a like fastening at each joint or lap. The inner edge, *l l l*, of the trough may then be bent in or pressed against the back or surface of the tree, or a little hay or any other packing may be used, if necessary, to prevent any passage for the grubs or worms; and, if necessary, the joints may be stopped or made water-tight by a little paint, tar, or grease.

The weight of the trough may be sustained by tying a small rope or other article around the tree below it, or by driving two or three nails below it.

I fill the trough A B with water, (though any other liquid will answer,) so that if any grubs or worms attempt to cross it they will be drowned. For small shrubbery, single or in clusters, as in gardens, yards, &c., I prefer setting the trough on the ground surrounding them, but securing the joints or laps in the same manner.

If the tree should grow so as to render it necessary, I can loosen one of the clasps and allow the lap, as at $b$ or $a$, to slip a little, and then tighten it again.

What I claim as my invention, and desire to secure by Letters Patent, is—

The use of a clasp or fastener composed of two semicircular parts, as $c$ $c$ and $e$, for the purpose of fastening the joints of troughs for tree-protectors, &c., when constructed and fitted for use substantially as herein described and set forth.

LOCKWOOD SANFORD.

Witnesses:
GEO. E. TOWNSEND,
R. FITZGERALD.